May 16, 1961 R. A. DENTON 2,984,314
TRAPPING DEVICE
Filed Nov. 22, 1957
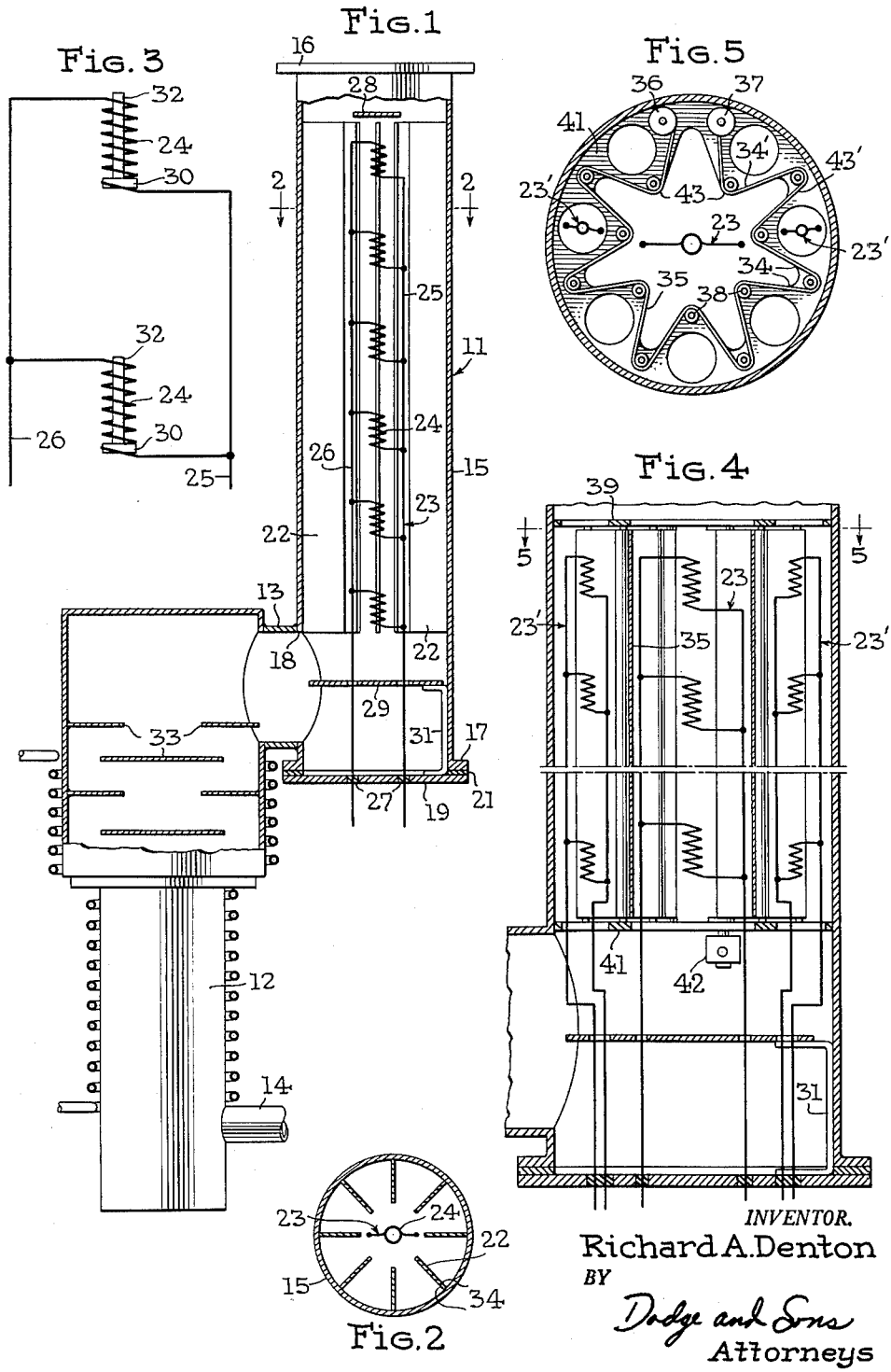
INVENTOR.
Richard A. Denton
BY
Dodge and Sons
Attorneys

United States Patent Office 2,984,314
Patented May 16, 1961

2,984,314
TRAPPING DEVICE

Richard A. Denton, Haddonfield, N.J., assignor to The New York Air Brake Company, a corporation of New Jersey Filed Nov. 22, 1957, Ser. No. 698,127

3 Claims. (Cl. 183—4)

This invention relates to trapping devices for use in vacuum systems for preventing the back streaming of vapor molecules from the vacuum pump into the system being evacuated and for gettering the gas molecules being pumped.

In vapor vacuum pumps, i.e., diffusion or condensation pumps and ejector pumps, vapor molecules, either scattering from the hot vapor jet or evaporating from the hot portions of the nozzle, frequently move toward the inlet or high vacuum side of the pump. A similar condition is encountered in mechanical vacuum pumps due to the evaporation of oil sealants and lubricants. The art has long sought an effective way of preventing these molecules from reaching the system being evacuated. Hot traps, cold traps, charcoal traps and baffles have been tried but none of these devices has been entirely satisfactory. The hot and cold traps are expensive and in addition create troublesome operating and maintenance problems. On the other hand, charcoal traps and degassed copper baffles can be used only for limited periods of operation because, as they become saturated with vapor molecules, their trapping efficiency decreases drastically.

The object of this invention is to provide a vapor trapper of the baffle type in which fresh trapping surfaces can be placed on the baffles while the pump is running without opening any of the high vacuum lines. According to the invention, the device comprises a baffled chamber in which are located one or more vaporizers for evaporating material which is to be deposited as a trapping coating on the baffles. The chamber is mounted in the system either between the chamber being evacuated and the vacuum pump or between successive pumping stages in a multistage pumping system. Prior to operation, the vaporizer is charged with trapping material and when, during operation, the baffling surfaces become saturated with back streaming vapor molecules, one or more of the vaporizers are energized to evaporate the trapping material. This vaporized material deposits on the saturated surfaces of the baffles and forms a fresh active trapping coating. By periodically energizing the vaporizer, it is possible to maintain an efficient trapping surface on the baffles for prolonged perods of time.

It is believed that the vapor molecules are trapped primarily by a process of adsorption. However, with some trapping materials, it is possible that the deposited coating will be porous and therefore some molecules will be trapped by absorption. Regardless of the mechanism by which trapping takes place, be it adsorption, absorption or some other process, the basic feature of this invention is the ability to reproduce fresh active trapping surfaces while the vacuum pump is operating and without opening any of the high vacuum lines.

The invention may also be used as a getter for the gas molecules in the system being evacuated and thus it may function as a pump. In this case, gas molecule gettering materials are placed in the vaporizer and the baffles are periodically coated with active gettering surfaces.

Since the device of this invention can perform two separate functions, it will be understood that the terms trap, trapper and trapping include apparatus, materials and processes for collecting pumping vapor molecules as well as those for collecting molecules of the gas being pumped.

A preferred embodiment of the invention will now be described in relation to the accompanying drawing, in which:

Fig. 1 is an elevation view of the trapping device in combination with a vapor vacuum pump, portions of the housings of both the pump and the trapper being broken away to show internal structure.

Fig. 2 is a sectional view taken on line 2—2 of Fig. 1.

Fig. 3 is an enlarged view of two charged heater filaments.

Fig. 4 is an elevation view, in section, of a modified form of the invention.

Fig. 5 is a sectional view taken on line 5—5 of Fig. 4.

Referring to Fig. 1, the preferred form of trapping device 11 is shown in combination with a vapor vacuum pump 12 having inlet (high vacuum) and outlet (fore pump) connections 13 and 14, respectively. The trapping device 11 comprises an open ended tubular housing 15 fitted with flanges 16 and 17 at its opposite ends, and containing an opening 18 registering with the inlet connection 13 of vapor pump 12. Cover plate 19 and gasket 21 are secured to flange 17 by bolts (not shown) for closing and sealing the lower end of the housing. A plurality of radially extending baffles 22 are supported within housing 15 by suitable clamps (not shown). These baffles are made from thin sheets of adsorbent material such as degassed copper. In the center of housing 15 is a vaporizer 23 comprising a plurality of longitudinally spaced helically coiled tungsten heater filaments 24. The filaments are supported by electrical conductors 25 and 26 which enter the housing through sealed openings 27 in cover plate 19. While only one vaporizer has been shown in the drawing, it will be understood that several could be used in cases where unusually long periods of operation are contemplated. Transverse baffles 28 and 29 are mounted above and below vaporizer 23; the upper baffles being supported by housing 15 and the lower one being supported by brackets 31 which are attached to cover plate 19.

Prior to operation, the cover plate 19 would be removed and baffles 22 and vaporizer 23 withdrawn from housing 15. The baffles are degassed in a vacuum and then replaced in the housing. The vaporizer is charged by inserting small rods 32 of pumping vapor trapping material, such as degassed copper, into each of the coiled filaments 24 (see Fig. 3). The rods 32 will be held in place by tungsten plates 30 located between the two lowermost coils of the filament. After the device has been reassembled, the flange 16 is coupled to the system to be evacuated and the fore pump (not shown) and vapor pump 12 are started.

During operation, backstreaming vapor molecules which move past the pump baffles 33 and through opening 18 in housing 15 will collide with and be adsorbed by radial baffles 22. When the surfaces of these baffles become saturated with vapor molecules, and therefore cease to be an effective trapper, the vaporizer 23 will be energized by passing an electric current through conductors 25 and 26. The heat generated in filaments 24 will vaporize the rods 32, thereby causing the trapping material to be deposited on the saturated surfaces of baffles 22 as a fresh adsorbent coating. When the baffles are completely covered, the vaporizer will be deenergized. As pump 12 continues to run, this coating process will be repeated periodically so that an efficient adsorbent surface will be maintained on the baffles.

While the pump baffles 33 do not constitute an essential part of the invention, it is nevertheless desirable that the number and arrangement of these baffles be selected to provide effective condensation of the major portion of the backstreaming vapor molecules. If these baffles are not efficient, the adsorbent baffles 22 in the trapping device will become saturated very quickly, thus necessitating frequent vaporization of the trapping material.

Because of the structural arrangement of the Fig. 1 embodiment, the remote portions 34 of baffles 22 may not receive an adequate coating of trapping material. Obviously, this would decrease the efficiency of the trapping device. This disadvantage is overcome in the modified form of the invention shown in Figs. 4 and 5. In this improved embodiment, the stationary radial baffles are replaced by a flexible sheet of adsorbent material 35, such as copper foil, which extends between a storage reel 36 and a take-up reel 37 in a serpentine path around vaporizer 23. This path is defined by a plurality of idler rolls 38. The reels and the rolls are journaled in spiders 39 and 41 which are removably attached to housing 15 by suitable clamps (not shown). An electric motor 42 drives the take-up reel 37. Two additional vaporizers 23' are provided for coating the outer surface of flexible surface 35.

As in the Fig. 1 embodiment, the trapping material, in the form of rods, is evaporated by energizing vaporizers 23 and 23'. However, in this case, the electric motor 42 will be energized while the flexible sheet 35 is being coated so that the remote portions 34 and 34' will pass the points 43 and 43' adjacent the vaporizers 23 and 23'. In this way, the entire surface of both sides of flexible sheet 35 will receive a coating of trapping material.

In both embodiments of the invention, the vaporizers could be charged with a trapping material, such as barium, which when vaporized would deposit on the radial baffles and serve as a getter for the gas molecules in the system being evacuated. As in the case of the pumping vapor adsorbing surfaces, when the surfaces of the barium coated baffles become saturated, the vaporizers are energized and fresh active coatings are reproduced on the baffles. The gas getter material could be placed in some or all of the filaments so that the device could function as a combined pumping vapor and pumped gas trap or solely as a pumped gas trap.

As stated previously, the drawing and description relate only to a preferred embodiment of the invention. Since many changes can be made in this embodiment without departing from the invention idea, the following claims should provide the sole measure of the scope of the invention.

What is claimed is:

1. A trapping device comprising a housing containing an elongated passage having longitudinally spaced inlet and outlet ports; longitudinal storage and take-up reels journalled in the housing; a flexible sheet of base material extending between the reels; means for driving the take-up reel; a plurality of longitudinal idler rolls journalled in the housing and engaging the flexible sheet, said rolls defining in the passage a serpentine path for the base as it moves between reels; and a plurality of longitudinally spaced electrical heater filaments located in the elongated passage for vaporizing trapping materials which are to be deposited as coatings on the flexible sheet.

2. The trapping device defined in claim 1 in which the serpentine path defined by the idler rolls extends around the electrical heater filaments.

3. The trapping device defined in claim 2 including a second set of longitudinally spaced electrical heater filaments located on the side of the flexible sheet opposite to the first set.

References Cited in the file of this patent

UNITED STATES PATENTS

| 1,535,157 | Hughes et al. | Apr. 28, 1925 |
| 2,302,807 | Shoeld | Nov. 24, 1942 |
| 2,395,552 | Johnson | Feb. 26, 1946 |
| 2,508,765 | Morand | May 23, 1950 |
| 2,727,167 | Alpert | Dec. 13, 1955 |
| 2,796,555 | Connor | June 18, 1957 |
| 2,826,827 | Metz | Mar. 18, 1958 |